Feb. 20, 1951     C. A. BROWN     2,542,273
TEMPERATURE CONTROLLED MIXING VALVE
Original Filed March 1, 1944
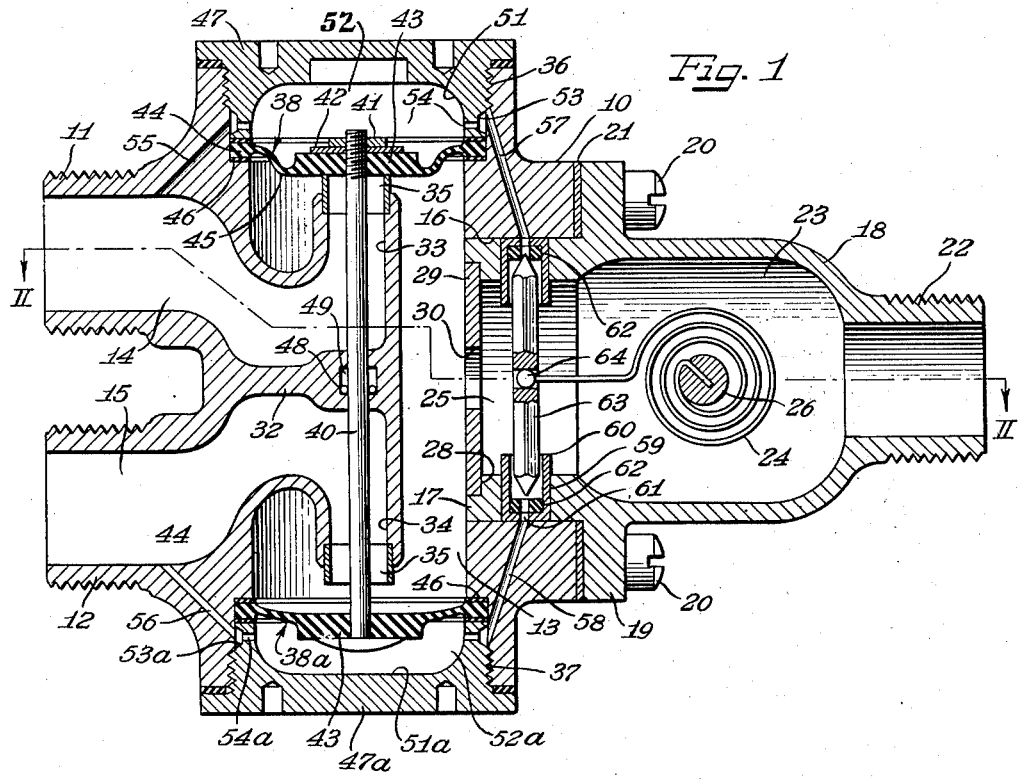
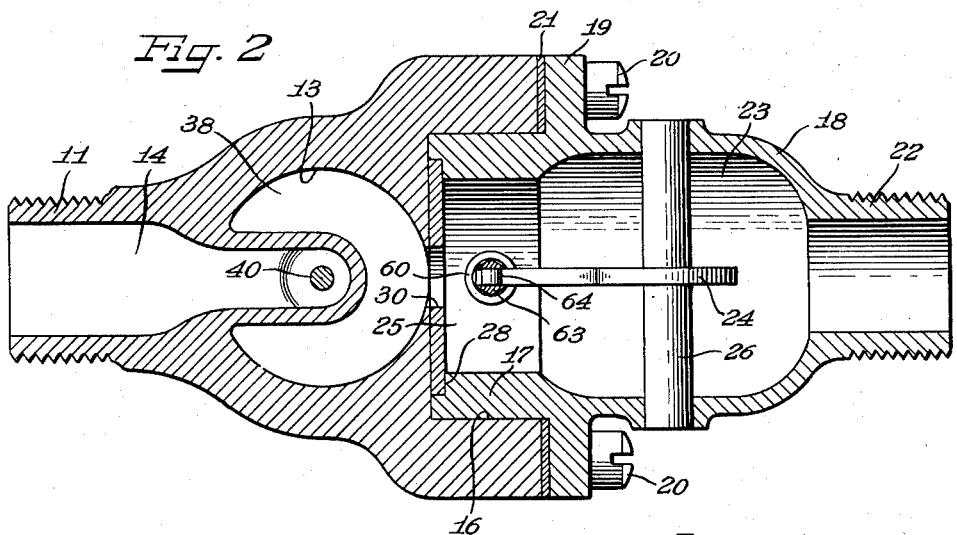
Inventor
Clyde A. Brown
by *The Firm of Charles W. Hills*     Attys Patented Feb. 20, 1951

2,542,273

UNITED STATES PATENT OFFICE 2,542,273

TEMPERATURE CONTROLLED MIXING VALVE

Clyde A. Brown, Luck, Wis., assignor to The Dole Valve Company, Chicago, Ill., a corporation of Illinois Original application March 1, 1944, Serial No. 524,546. Divided and this application February 18, 1948, Serial No. 9,113

3 Claims. (Cl. 236—12)

This invention relates to apparatus for producing a uniform fluid mixture from a plurality of individual fluids, each of which possesses certain distinct physical characteristics; and more particularly to a temperature controlled fluid mixing valve.

The term "physical characteristic," as hereinafter employed, refers either to an inherent property of the fluid, or to a temporarily imposed condition or state of the fluid, such for example, as temperature or pressure.

In the production of any fluid mixture having a certain predetermined degree of uniformity from a plurality of different fluid supplies, it is necessary to take into account certain variations which may inadvertently occur in the fluid supplies as they are introduced to the mixing area. Thus, in a temperature controlled mixer valve, variations in pressure and temperature of each of the individual supplies will result in non-uniformity of the ultimate combination.

One of the features of the present invention is to provide apparatus for producing a uniform fluid mixture having certain predetermined optimum characteristics from a plurality of individual fluid supplies having differing physical characteristics or properties and for obtaining this uniform mixture irrespective of changes in the physical characteristics or properties of the component fluid supplies.

One of the principal features and objects of the present invention is to provide a novel means for producing a uniform fluid mixture from a plurality of fluid supplies having different physical characteristics or properties.

A further object of the present invention is to provide means for employing one or more of the characteristics or properties of the individual fluid supplies in controlling the admission of the proper proportions of the component fluids to produce the desired fluid mixture.

A still further object of the present invention is to provide means for mixing proper proportions of the component fluid supplies to produce a mixture having the desired predetermined physical characteristics or properties.

Another and further object of the present invention is to provide thermostatically controlled means which serves to create a pressure differential between portions of the several fluid supplies employed in producing a given fluid mixture for controlling the admission of the individual fluid supplies to the mixing area.

Another object of the present invention is to provide a double pilot controlled temperature controlled mixing valve.

The novel features which I believe to be characteristic of my invention are set forth with particularity in the appended claims. My invention itself, however, both as to its manner of construction and method of operation, together with further objects and advantages thereof, may best be understood by reference to the following description taken in connection with the accompanying drawing, in which:

Figure 1 is a sectional view taken in a longitudinal plane through a temperature controlled mixer valve embodying the novel principles and teachings of the present invention; and Figure 2 is a sectional view taken through the mixing valve shown in Figure 1 as viewed along the line II—II.

This invention is a division of my copending application for "Method of and Means For Producing a Uniform Fluid Mixture," U. S. Serial No. 524,546, filed March 1, 1944, issued as Patent No. 2,449,766 on September 21, 1948, and assigned to the same assignee as the present invention.

As illustrated in Figures 1 and 2 of the drawing, the valve unit is of the double diaphragm, pilot operated type which is advantageously employed in mixing hot and cold water to produce a mixed water supply of predetermined constant temperature. The structure comprises a casing 10 provided with a pair of externally threaded inlet connections 11 and 12 for connecting with suitable supply conduits for introducing hot and cold water, respectively, to the internally disposed mixing chamber 13 in the casing 10 by means of inlet passages 14 and 15 associated with said connections 11 and 12, respectively. An opening 16 is provided in the wall of the casing 10 substantially opposite the point at which the inlet passages 14 and 15 are disposed for communication with the mixing chamber 13 in said casing 10.

An extension 18 having a projection 17 and a flanged portion 19 is adapted to be inserted in the opening 16 in the wall of casing 10 in such fashion that the flanged portion 19 will register with the outer wall of casing 10. The extension 18 is secured to the casing 10 as by means of a plurality of fastening means, such as the machine screws 20, which may be threaded into holes provided in the casing wall. A suitable gasket 21 is provided at the junction of the flanged portion 19 with the wall of the casing 10 to prevent the leakage of fluid from the mixing chamber 13 through the opening 16 and between the casing 10 and extension 18.

The extension 18 provides an externally threaded connection 22 to which may be secured any suitable form of fluid conduit for handling the mixed water supply discharged from the mixer valve unit. The outlet connection 22 communicates with the thermostat chamber 23 formed within the extension 18 in which is disposed a suitable thermo-sensitive element 24. The thermostat chamber 23, in turn, connects with the mixing chamber 13 of the casing 10 as by means of the bore 25 extending through the projection 17 of the extension 18.

The thermostatic element 24 may conveniently take any suitable form, being illustrated here as being a bimetallic coil which is supported in any suitable fashion, such, for example, as by means of the pin 26. The pin 26, to which an end of the coil of the thermostatic element 24 is secured, extends transversely of the thermostat chamber 23 and is supported by the walls of the extension 18. While it is preferable that the thermostatic element 24 of the mixer valve unit be adjusted to provide a desired predetermined temperature of the mixed water supply when it leaves the factory, means may advantageously be provided to afford adjustment of the setting to provide a certain degree of flexibility in the operation of the unit.

A counterbore in the end of the bore 25 cut into projection 17 of the extension 18 and adjacent the mixing chamber 13 forms a shoulder 28 which accommodates a plate 29 which may be press fit or otherwise suitably secured therein. The plate 29 is provided with an orifice 30 disposed substantially centrally thereof for regulating the flow of the fluid from the mixing chamber 13 into the thermostat chamber 23 of the extension 18 by way of the bore 25.

The inlet passages 14 and 15 are separated by a wall portion 32 disposed internally of the casing 10 and have outlets 33 and 34, respectively, at the mixing chamber 13. The outlets 33 and 34 have annularly shaped inserts 35 disposed in the openings thereof to afford valve seats. The inserts 35 may be secured in the outlets 33 and 34 in any suitable fashion, but are advantageously inserted in such a way that they form little or no obstruction to the flow of fluid therethrough to the mixing chamber 13.

A pair of openings 36 and 37 are provided extending through the wall of the casing 10 opposite each of the outlets 33 and 34 with their axes substantially normal to the inlet passages 14, 15 and the opening 16 in the casing so as to communicate with the mixing chamber 13. A pair of annularly shaped diaphragms 38, 38a are mounted at opposite ends of a headed rod 40 which passes through a centrally disposed aperture in the reinforced central valve portion 43 of each diaphragm and is slidably carried in apertures in the wall 32 of the casing 10. The rod 40 is threaded at one end to receive a nut 41 backed by a washer 42 to serve as an adjustment for the spacing between the valve portions 43 of said diaphragms 38, 38a.

The diaphragms 38 and 38a may be formed of rubber, synthetic rubber, neoprene or other similar material to produce the desired flexibility of operation. Each diaphragm comprises an external annular bead portion 44 and an imperforate flexible web portion 45 which supports the centrally disposed valve portion 43 adapted to seat against the insert 35 in the outlets 33 or 34 of inlet passages 14 and 15, respectively. The diaphragms 38, 38a are secured in place against an annular shoulder 46, formed by counterboring the openings 36 and 37, as by means of the thimbles 47, 47a which are threaded into said openings 36 and 37. Suitable gaskets may be provided on opposite sides of the bead portions 44 of the diaphragms 38, 38a and under the flanged ends of thimbles 47, 47a to prevent leakage of fluid from the mixing chamber 13.

The rod member 40, at the point where it passes through the internal wall 32, is supplied with a packing ring 48 disposed about its periphery. The packing ring 48 is disposed in an enclosure 49 formed within the wall 32 which permits said packing ring to move axially with the rod 40 without restricting the freedom of movement of the rod.

Recesses 51, 51a are formed in the underside of thimbles 47, 47a and cooperate with the diaphragms 38, 38a to provide enclosed chambers 52, 52a. An annular groove 53, 53a is cut into the external periphery of each thimble 47, 47a and communicates with recesses 51, 51a through a plurality of substantially radially extending apertures 54, 54a. The grooves 53, 53a on the inlet side of the assembly are connected to the respective inlet passages 14 and 15 through the respective passageways 55 and 56. Passageways 57 and 58 connect the grooves 53 and 53a on the outlet side of the assembly with the opening 16 in the wall of the casing 10.

The projection 17 of the extension 18 has a pair of oppositely disposed apertures 59 extending through the wall thereof and accommodating the generally cylindrically shaped guides 60. Each of the guides 60 has an aperture 61 in the base thereof which registers with the passageway 57 or 58, as the case may be. A washer 62 composed of rubber, artificial rubber, neoprene or other similar material is secured in the base of each guide 60 in such fashion that its aperture registers with the aperture 61 in the base of the guide 60.

The washers 62 serve to form a somewhat more flexible contact for the generally cone-shaped ends of a pilot valve 63 which extends transversely of the bore 25 of the projection 17 of extension 18. The pilot valve 63 is flexibly mounted upon the free end of the thermostatic element 24 as by means of the slot and cylinder connection 64 to control the flow of fluid through the passages 57 and 58. The inwardly projecting generally cylindrical walls of the guides 60 serve to aid in centering the cone-shaped ends of the pilot valve 63 with respect to the openings in the washers 62 against which these ends seat in the operation of the device.

In the operation of the mixer valve unit of the present invention, the fluid supplied by the conduits connected to inlet passages 14 and 15 passes into the mixing chamber 13, and through the orifice 30 in plate 29 into the thermostat chamber 23. The thermostatic element 24, as already indicated, has been adjusted to produce a fluid mixture of a desired predetermined temperature.

As the fluid entering the thermostat chamber 23 comes into contact with the thermostatic element 24, the element reacts to cause the pilot valve 63 to seat against one of the washers 62 in one of the guides 60, which tends to cut off either passageway 57, if the fluid mixture is too hot, or passageway 58 if the mixture is too cold. It will be understood that when the temperature of the mixed fluid entering the thermostat chamber is substantially the same as that for which the thermostat is set, the pilot valve 63 will be balanced at some point between the extremities of its lateral movement.

When the individual fluid supplies are introduced to their respective inlet passages 14 and 15 at the start of the operations, a small part of each fluid supply by-passes through passageways 55 and 56 into the chambers 52 and 52a formed by recesses 51 and 51a in thimbles 47 and 47a and out through passageways 57 and 58 into the thermostat chamber 23. By reason of the fact that the several passageways are open when the pilot valve is positioned equi-distant the washers 62 in guides 60, the fluid pressure on the diaphragms 38 and 38a adjacent the recesses 51 and 51a of thimbles 37 and 37a is substantially equal. The fluid will thus continue to flow into the mixing chamber 13 through outlets 33 and 34 until a variation in temperature or pressure of the fluid supplies occurs.

If a change in temperature or pressure takes place in one or both of the fluid supplies, the thermostatic element 24 immediately operates to shift the pilot valve 63 to adjust the opening through which the fluid escapes from chambers 52 or 52a, as the case may be, to compensate for this variation. Let us assume that the temperature of the hot fluid admitted through inlet passage 14 drops. The thermostatic element 24 instantly reacts to the lowering of the temperature of the mixed fluid, thus moving the pilot valve 63 toward a position to close off the passage 58 and thereby causing the passage 57 to be opened more.

The opening of passage 57 causes the fluid to drain more rapidly from chamber 52 thereby reducing the fluid pressure on diaphragm 38 within the chamber 52. Conversely, the closing of passage 58 simultaneously creates a greater pressure against the diaphragm 38a in the chamber 52a. A temporary pressure differential will thus exist externally of diaphragms 38 and 38a which causes the rod 40 to shift axially. The valve portion 43 of diaphragm 38 recedes farther from its seat on insert 35 in outlet 33 while the valve portion 43 of diaphragm 38a is urged toward its seat on its associated insert 35 in outlet 34. The aforementioned operations permit the admission of a greater proportion of hot fluid and a consequent diminution of the supply of cold fluid to mixing chamber 13.

With the elements disposed in the position shown in Figure 1 of the drawings, the hot fluid supply is temporarily closed off completely. When the temperature of the mixed fluid has been adjusted to the temperature for which the thermostatic element 24 is set, the pilot valve 63 will be shifted and the flow of hot fluid again restored in the manner above described.

A change in the pressure of one of the fluid supplies for the mixer valve unit will cause the structure to react in a manner similar to that just described as being caused by a variation in temperature. It will be understood that the opposite operation takes place in the event that the temperature of the hot fluid supply increases or the pressure of the cold fluid supply is reduced, bringing about a consequent change in the mixed fluid temperature.

The principle of operation involved, therefore, is one of utilizing the pressure in the individual fluid supplies controlled by a pilot valve actuated by a thermo-sensitive element to create a pressure differential to open and close the outlets through which the fluid supplies are admitted to the mixing area.

The mixer valve unit of Figures 1 and 2 is particularly advantageous in that the use of two diaphragms overcomes chattering by reason of the fact that the diaphragms will always be out of phase with respect to each other as far as dynamic forces tending to produce a pulsating condition are concerned.

While I have shown a particular embodiment of my invention, it will, of course, be understood that I do not wish to be limited thereto since many modifications may be made, and I therefore, contemplate by the appended claims to cover all such modifications as fall within the true spirit and scope of my invention.

I claim as my invention:

1. A mixer valve comprising a housing, an inlet in said housing for each of two fluids under pressure, an outlet in said housing for the mixed fluid, a mixing chamber in said housing between said inlets and said outlet, a pair of auxiliary fluid chambers within said housing in open fluid communication with said inlets respectively, a flexible membrane for each of said auxiliary chambers separating its associated auxiliary chamber from said mixing chamber, a fluid drain from each of said auxiliary chambers to said mixing chamber a pilot valve in each of said drains, said pilot valves being mounted to selectively open and close said drains, each of said membranes having a portion thereof acting as valve means in said inlets respectively, said membranes being mechanically coupled together and arranged so that as one inlet is closed the other is opened, and said pilot valves being mechanically coupled together so that as one drain is opened the other is closed, whereby the temperature level of the mixed fluid may be determined by the selective operation of the pilot valves.

2. A mixer valve comprising a housing, an inlet in said housing for each of two fluids under pressure, an outlet in said housing for mixed fluid, a mixing chamber in said housing between said inlets and said outlet, a pair of auxiliary fluid chambers on opposite sides of said housing in fluid communication with said inlets respectively, one of said inlets having a port facing one of said auxiliary fluid chambers and the other of said inlets having a port facing the other auxiliary fluid member, a flexible membrane for each of said auxiliary chambers separating its associated chamber from said mixing chamber and disposed opposite said ports respectively, whereby each membrane acts as a valve for its associated port, means mechanically coupling said membranes together to move as a unit to simultaneously open one inlet and close the other in varying degree, a fluid drain for each of said auxiliary chambers, a pilot valve in each drain, said pilot valves being mounted to selectively open one drain and close the other, and a temperature responsive element in said mixing chamber mechanically coupled to said pilot valves to move the same to open and closed positions and vice versa thereby to maintain a predetermined temperature for the mixed fluid.

3. A mixer valve for producing a fluid mixture of predetermined uniform temperature from two fluids under pressure having different temperatures irrespective of changes in the temperature and pressure of each component fluid, said mixer valve comprising a housing, an inlet in said housing for each fluid, valve means in said inlets, an outlet in said housing for the mixed fluid, a mixing chamber in said housing, a thermo-sensitive element in said housing between the inlets and the outlet, a pair of enclosures associated with the housing one wall of each of which is flexible, a by-pass interconnecting each of the inlets with the interior of each enclosure, a passage connecting the interior of each enclosure with the mixing chamber, pilot valve means seatable in each passage mounted on and actuated by the thermo-sensitive element to simultaneously open and close the passages, and means mechanically connecting said flexible walls together to shift the valve means in the inlets for controlling the admission of the fluids to the mixing chamber.

CLYDE A. BROWN.

REFERENCES CITED

The following references are of record in the file of this patent:

UNITED STATES PATENTS

| Number | Name | Date |
|---|---|---|
| 1,869,663 | Cartier | Aug. 2, 1932 |
| 2,272,403 | Fields | Feb. 10, 1942 |
| 2,308,165 | Fields | Jan. 12, 1943 |
| 2,316,075 | King | Apr. 6, 1943 |

FOREIGN PATENTS

| Number | Country | Date |
|---|---|---|
| 882,839 | France | Mar. 8, 1943 |